United States Patent [19]

Vittorio

[11] Patent Number: 4,533,823
[45] Date of Patent: Aug. 6, 1985

[54] CODING SYSTEMS FOR ELEMENTS OF MACHINE TOOLS, PARTICULARLY OF THE NUMERICALLY CONTROLLED TYPE

[75] Inventor: Corni Vittorio, Modena, Italy

[73] Assignee: Comau S.p.A., Grugliasco, Italy

[21] Appl. No.: 457,277

[22] Filed: Jan. 11, 1983

[30] Foreign Application Priority Data

May 12, 1982 [IT] Italy .................................. 67624 A/82

[51] Int. Cl.³ ............................................. G06F 15/20
[52] U.S. Cl. .................................... 235/375; 235/383; 235/462; 364/478
[58] Field of Search ........................ 235/383, 462, 375; 364/474, 475, 478

[56] References Cited

U.S. PATENT DOCUMENTS

| 4,152,583 | 5/1979 | Nakamura | 235/462 |
| 4,281,342 | 7/1981 | Ueda et al. | 364/478 X |
| 4,430,717 | 2/1984 | Senda et al. | 364/478 X |

Primary Examiner—David L. Trafton
Attorney, Agent, or Firm—Young & Thompson

[57] ABSTRACT

A coding system for elements of machine tools, particularly of the numerically controlled type, consisting of a "bar" code (14) applied to the element (10) to be coded, and read by a reading head (17) provided with a code detecting sensor (18) connected to a circuit for transforming the code into signals fed to utilization circuits (21, 26) which operate by comparing the read message with a set signal.

6 Claims, 6 Drawing Figures

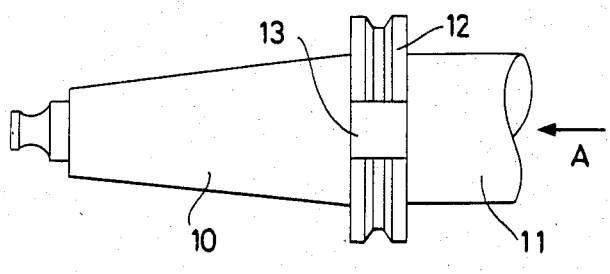
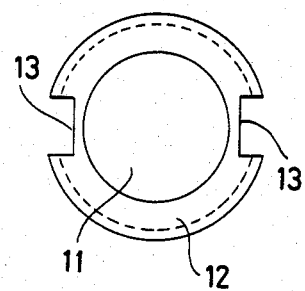
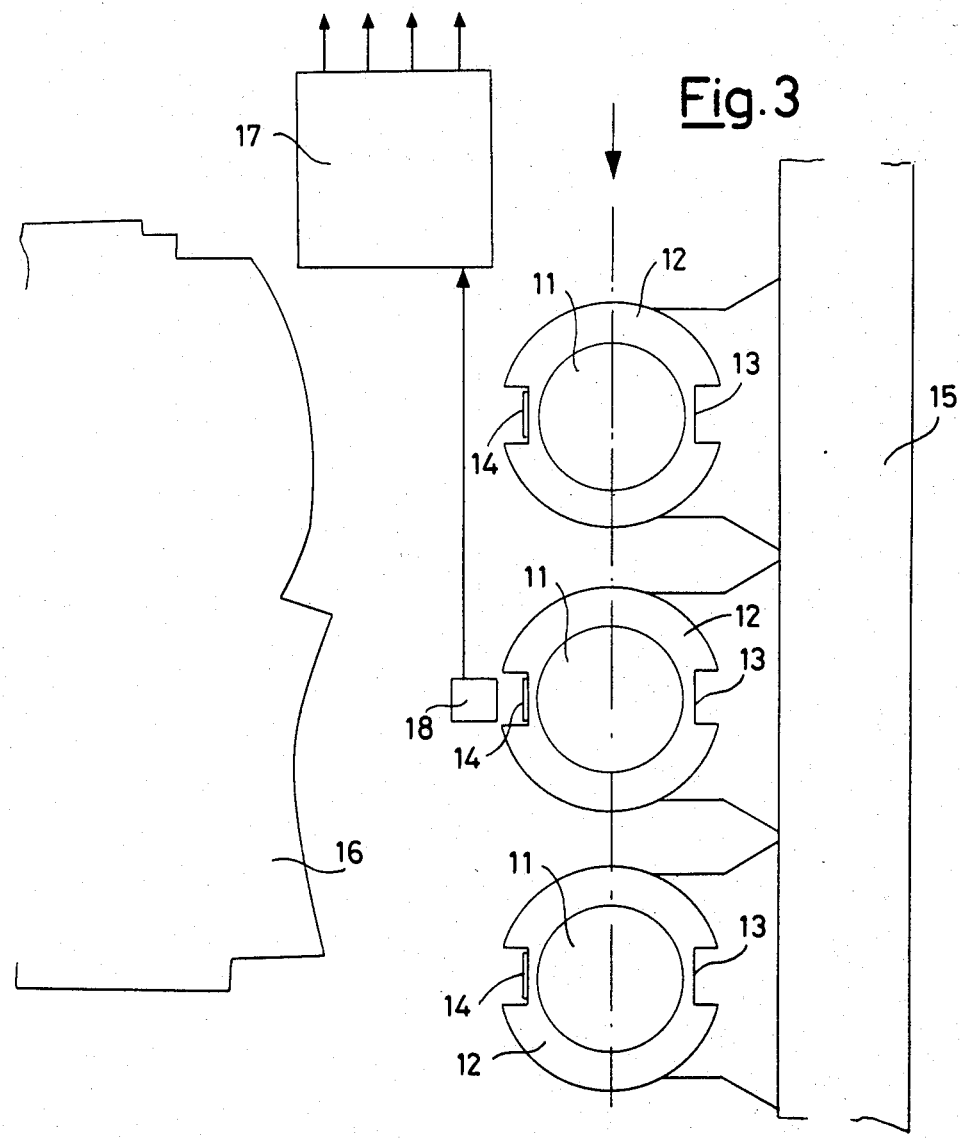

CODING SYSTEMS FOR ELEMENTS OF MACHINE TOOLS, PARTICULARLY OF THE NUMERICALLY CONTROLLED TYPE

DESCRIPTION

The invention relates to an improvement in coding systems for elements of machine tools, particularly of the numerically controlled type.

More specifically, the invention relates to a recognition system for elements such as tools or tool holders, which uses an optical or telecamera sensor and a "bar" code mounted on the coded element and readable by means of said optical sensor.

The fields of application of this system are various, so that only one of them will be described by way of non-limiting example.

For example, in numerically controlled machine tools, the tools or tool holders held in store must be identified unambiguously by means of a code which can be read by the machine and then by a processor which controls the withdrawal and replacement of the necessary tools at any given time.

The various coding systems currently used include for example a system comprising an assembly of rings applied to the outside of the tool holder case, this resulting in considerable radial or axial overall size, according to the particular arrangement used, and a modification to the standard tool holder.

Another known system comprises an assembly of pins applied perpendicularly to the tool holder surface in seats formed directly in the tool holder and disposed along two generating lines of said tool holder at 180° to each other. Of the various drawbacks of this system, the most important is that it requires the tool holder to be in phase at least at the moment of reading the code, besides requiring the said modification to the standard tool holder.

A further known system uses for coding purposes an assembly of annular bands either applied to or integral with the tool shank, said annular bands being either electrically conducting or not electrically conducting according to the particular code for the tool concerned, the code being read by a line of electromagnetic proximity sensors independently of any phasing of the tool or tool holder. This system is costly and requires a lengthy application time, and in addition does not result in a high numerical selection capacity.

The object of the present invention is to provide an improved coding system for tools and tool holders which obviates the drawbacks of known systems. In particular, the proposed system reduces the costs and time of application of the tool recognition code, in addition to increasing the numerical selection capacity with respect to current systems, without altering the form of the standard tool holder.

According to the invention, a system is used for coding machine tool elements, characterized in that a "bar" code is applied to the element, the code being read by a reading head provided with a code detection sensor.

A preferred but non-limiting embodiment of the invention is described hereinafter with reference to the accompanying drawings, in which:

FIG. 1 is a fragmentary view of a tool holder shank provided with the coding system according to the present invention;

FIG. 2 is a view of the tool holder of FIG. 1 in the direction of the arrow A;

FIG. 3 is a diagrammatic view of a preferred method using the coding system according to the invention;

Figure 4:
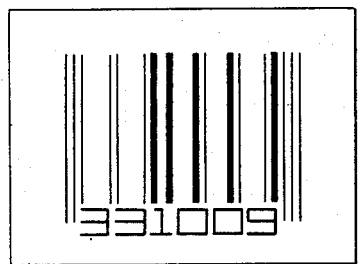
FIG. 4 is a plate carrying the bar code used by the invention.

FIGS. 1 and 2 show a tool or tool holder 10 of substantially conical configuration, connected to a cylindrical shank 11 by way of an annular zone 12 projecting from said elements 10 and 11.

The illustrated element is of known type, normally used on numerically controlled machine tools.

Two diametrically opposed recesses 13 are provided in known manner in the annular portion 12.

According to the invention, a plate 14 (FIG. 4) provided with a bar code is fitted into one of said recesses 13. The merits of the bar code itself will not be discussed in detail, this being an optoelectronic system available commercially and used currently in various applications.

It consists basically of a surface of the type illustrated in FIG. 4, i.e. constituted by a plurality of wide and narrow bars various interspersed and spaced apart. By convention, a wide bar can represent "one" in binary code, and a narrow bar can represent "zero" or vice versa. The required binary code is obtained by the different combinations of bars and their composition on the strip. The most suitable codes for this purpose are the "two-out-of-five" or "three-out-of-nine" code.

The preferred code will however be determined by the applicational requirements, in which respect the first type, namely the "two-out-of-five" code, is limited to the detection of figures plus a message initiation and termination signal, whereas the second, the "three-out-of-nine" code, has a greater capacity because it can also define letters, but for the same extent of message requires a greater quantity of signals, with consequent increased space requirements.

FIG. 3 diagrammatically illustrates one field of application of the invention. A tool store 15 carries in known manner a plurality of tools or tool holders of the type illustrated in FIGS. 1 and 2.

Figure 5:
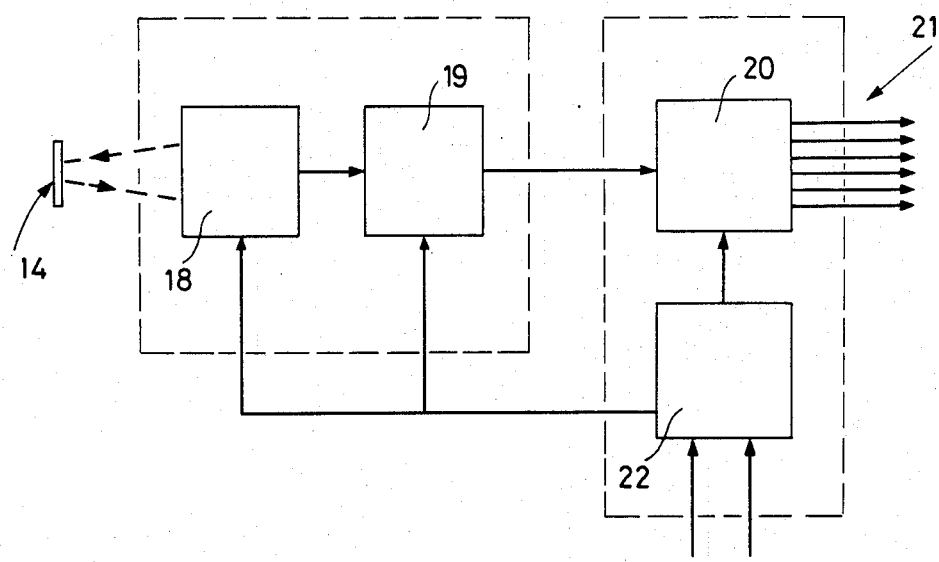
FIG. 5 is a block diagram showing a possible but non-limiting embodiment of the decoder-detector circuit used.

A bar code reading head 17 is inserted between the store 15 and the tool change unit 16. FIG. 5 shows the block diagram of the circuit of said head 17.

An optical sensor 18 detects the code on the plate 14 fitted to the tool holder. It is connected to an electronic pulse formation circuit 19 and to a decoder module 20, the purpose of which is to convert the pulses, which are read in series form on the bar code 14, into useful parallel output signals 21 (binary words).

The power supply from the mains reaches said components by way of a power supply circuit 22.

The output signals 21 are already suitable for feeding to the utilisation circuits of the series of words corresponding to the figures of the read code.

Figure 6:
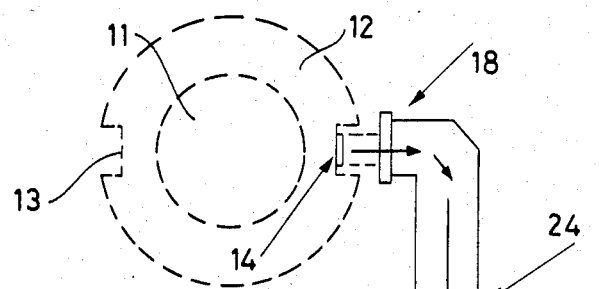
FIG. 6 is a diagrammatic view of a second method using the coding system according to the invention.

As an alternative to the described method, instead of using a reflection sensor with remote transmission of the electrical signal, it is possible to use a device as shown diagrammatically in FIG. 6, i.e. effecting total transfer of the image of the code 14 by means of a suitable optical system 24 on a linear telecamera 25 provided with a circuit for converting the image into parallel output signals 26 for utilisation.

In both the aforesaid cases, when the read code coincides with the code assigned to the required tool, authorisation is given for withdrawing the tool in question from the store, when this attains the predetermined axis.

Depending on the type of bar code and the relative reading system, it is possible to obtain a definition capacity of at least four decimal figures, equal to 10,000 numbers for assigning to tools. In this manner, an infinite number of tools can be coded, so enormously increasing the numerical selection capacity by an extremely low cost system.

In addition to the facility for using different types of bar code, it will be apparent that the plate 14 (FIG. 4), which has been illustrated by way of example only, can also be applied at points on the tool or tool holder other than the recesses 13, for example on one of the two front surfaces of the annular portion 12, or the cone 10, the shank 11 or any other point of any tool or tool holder, should this have a different configuration, or should the machine in question have special constructional requirements which make a different form of reading head 17 necessary. In this respect, the application shown diagrammatically in FIG. 3 is given purely as a non-limiting example of the system according to the invention.

As already stated, this system can in fact be used for coding and recognising any machine tool element, whether this be a tool or any other part, or even a workpiece being machined.

I claim:

1. A storage system for elements of machine tools, particularly of the numerically controlled type, comprising means (15) for storing a plurality of different said elements, a different "bar" code (14) carried by each different element, a reading head (17) for reading the different codes, and a code detection sensor (18) adapted to be juxtaposed successively with the various different elements to sense the code on the elements and to transmit to the reading head signals representative of the identity of the said element with which said sensor is juxtaposed.

2. A system as claimed in claim 1, characterised in that the sensor is connected to a decoder-converter circuit (20) for the read pulses, in such a manner as to transform said pulses into signals suitable for external utilisation circuits (21) which compare the read message.

3. A system as claimed in claim 2, characterised in that the sensor is connected to a circuit (20) for decoding the pulses read in series form and for converting them into binary code signals which are fed to utilisation means (21) for the read signals, which compare these latter with a set signal.

4. A system as claimed in claim 2, characterised in that the sensor (18) is an optical means arranged to transfer the image of the read code on to a telecamera (25) provided with a circuit for converting the image into parallel signals (26), which are fed to utilisation means for said signals, which compare these latter with a set signal.

5. A system as claimed in claim 1, characterised in that the "bar" code (14) is carried on a support or plate applied at a point (13) on the element (10) arranged to present itself in front of the sensor (18) during its movement.

6. A system as claimed in claim 1, characterised in that the "bar" code (14) is applied directly to the element (10) at a point (13) arranged to present itself in front of the sensor (18) during its movement.

* * * * *